No. 895,992. PATENTED AUG. 11, 1908.
S. S. EVELAND.
METHOD OF MAKING ANNULAR BEARINGS.
APPLICATION FILED NOV. 26, 1906.

Witnesses
W. A. Williams
Jack Richmond

Inventor
Samuel S. Eveland.
By, Augustus B. Stoughton
Attorney of the Philadelphia## UNITED STATES PATENT OFFICE.

SAMUEL S. EVELAND, OF PHILADELPHIA, PENNSYLVANIA.

METHOD OF MAKING ANNULAR BEARINGS.

No. 895,992.

Specification of Letters Patent.

Patented Aug. 11, 1908.

Application filed November 26, 1906. Serial No. 345,076.

*To all whom it may concern:*

Be it known that I, SAMUEL S. EVELAND, a citizen of the United States, and a resident of Philadelphia, in the county of Philadelphia and State of Pennsylvania, have invented a new and useful Method of Making Annular Bearings, of which the following is a specification.

The ring or annular ball bearing so-called, consisting of inner and outer rings with confronting grooves or races for the balls has become very popular with the trade and has gone into extensive use particularly on automobile work. It is essential in this type of bearing that the grooves or races shall be in perfect coincidence, otherwise heating and other troubles arise causing the bearing to rapidly deteriorate. Prior to my invention the practice was to make the rings from tubular blanks and to separately form and grind the grooves or races. This practice was disadvantageous because it was expensive as to time, labor and materials, and because it offered no assurance as to the accuracy, and uniformity of the product.

The principal objects of the invention are to obviate the defects and disadvantages heretofore encountered and to provide a method of making annular bearings at considerable less cost than heretofore and in which the grooves or races shall be absolutely coincident.

Briefly stated, the invention consists in preparing an annealed steel blank, in cutting away portions of the end of the blank to form concentric tubular parts, sleeves or projecting rings, and while the rings are in juxtaposition and still a part of the blank in simultaneously forming the confronting grooves or races, separating the rings from the blank and finally hardening, tempering and grinding the same.

The nature and characteristic features of the invention will be more readily understood from the following description taken in connection with the accompanying drawings, forming part hereof wherein—

Figure 1:
Figure 2:
Figure 3:
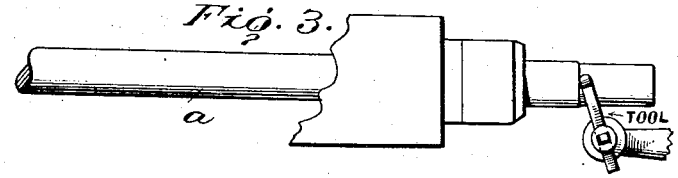
Figure 4:
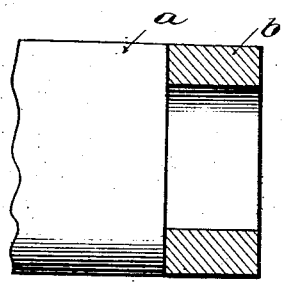
Figure 5:
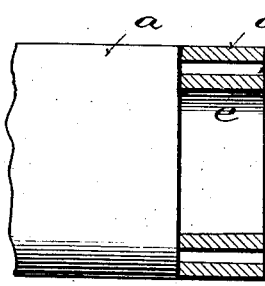
Figure 6:
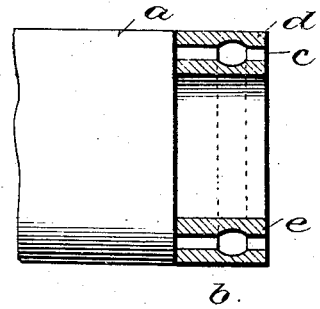
Figure 7:
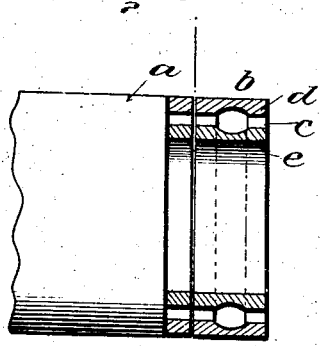
Figure 8:
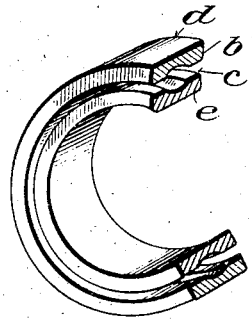
Figure 9:
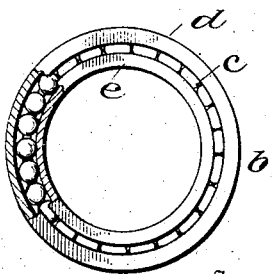

Figure 1, represents a cylindrical blank. Fig. 2, represents the same annealed. Fig. 3, represents the next step of dressing the blank to form the periphery of the outer ring. Fig. 4, is a sectional view of the end of the blank showing the same counterbored to form the inner periphery of the inner ring. Fig. 5, shows the blank after the completion of the next step that of making an annular recess or channel to form the outer periphery of the inner ring and the inner periphery of the outer ring. Fig. 6, is a sectional view of the blank after the next step of forming the coincident grooves or races. Fig. 7, is a sectional view of the blank and rings detached. Fig. 8, is a sectional perspective view of the rings, and Fig. 9, is a view of the rings with balls applied.

In the practice of the invention I prepare an annealed steel blank *a*, preferably high-carbon steel. I then dress it down to the desired diameter to form the periphery of the outer ring and counterbore the end of the blank whereby a tubular shank or sleeve *b*, is formed as represented in Fig. 4. I next cut an annular recess or channel *c*, in said sleeve, whereby are formed the outer periphery of the inner sleeve *e*, and the inner periphery of the outer sleeve *d*. These sleeves constitute respectively the outer and inner rings of an annular bearing, and the next step is to form the confronting grooves or races. This is accomplished while the sleeves *d* and *e*, are still integral with the blank (Fig. 6) whereby there is insured absolute accuracy and coincidence in the grooves. The sleeves or rings are next detached from the blank, as illustrated in Fig. 7 and finally they are hardened and tempered and ground and otherwise prepared for the assemblage of the balls.

Having described the nature and objects of the invention, what I claim as new and desire to secure by Letters Patent is:

The improved compound process of manufacturing mate annular bearing rings herein described, consisting in preparing an annealed steel blank, forming a portion of the blank into the periphery of the outer ring, forming the inner periphery of the inner ring by counter-boring the end of the blank, forming the inner periphery of the outer ring and the outer periphery of the inner ring by cutting an annular recess or channel in the end of the blank, forming races or grooves in the confronting peripheries of the rings while still an integral part of the blank, and separating the rings from the blank, said steps being performed progressively while the annealed blank is soft.

In testimony whereof I have hereunto signed my name in the presence of witnesses.

SAMUEL S. EVELAND.

Witnesses:
   JAS. A. RICHMOND,
   KATHERINE RICHMOND.